United States Patent [19]

Cowsert

[11] Patent Number: 5,540,476
[45] Date of Patent: Jul. 30, 1996

[54] CONVERTIBLE TOP COVERING RETAINER WITH METHOD FOR USING THE SAME

[75] Inventor: Lendell E. Cowsert, Taylor, Mich.

[73] Assignee: ASC Incorporated, Southgate, Mich.

[21] Appl. No.: 318,852

[22] PCT Filed: Apr. 15, 1992

[86] PCT No.: PCT/US92/03081

§ 371 Date: Dec. 9, 1994

§ 102(e) Date: Dec. 29, 1994

[87] PCT Pub. No.: WO93/21030

PCT Pub. Date: Oct. 28, 1993

Related U.S. Application Data

[63] Continuation of Ser. No. 680,371, Apr. 4, 1991, abandoned.

[51] Int. Cl.$^6$ .................. B60J 7/08; B60J 7/11; B60R 13/02
[52] U.S. Cl. .................. 296/107; 296/118; 296/146.14; 296/214; 160/392; 24/625
[58] Field of Search .................. 296/104, 107, 296/118, 121, 136, 146.14, 145, 147, 201, 214, 145; 160/392, 395, 398; 24/461, 462, 625; 680/371

[56] References Cited

U.S. PATENT DOCUMENTS

| | | | |
|---|---|---|---|
| 1,340,307 | 5/1920 | Vetter | 296/118 |
| 2,036,390 | 4/1936 | Bowers | 296/214 |
| 2,042,431 | 5/1936 | Hooper | 296/214 |
| 2,213,912 | 9/1940 | Hooper | 160/395 |
| 2,526,912 | 10/1950 | Swanson | 160/392 X |
| 2,556,565 | 6/1951 | Votypka | 296/118 |
| 2,560,493 | 7/1951 | Spring | 296/145 |
| 2,580,337 | 12/1951 | Votypka | 296/107 |
| 2,708,137 | 5/1955 | Poelman | 296/107 |
| 3,090,646 | 5/1963 | Johnson | 296/107 |
| 3,237,983 | 3/1966 | Hollar, Jr. | 296/107 |
| 3,774,959 | 11/1973 | Brody | 296/121 |
| 3,837,984 | 9/1974 | Wagner et al. | 428/65 X |
| 3,875,623 | 4/1975 | Johnston | 160/392 X |
| 3,953,067 | 4/1976 | Isola | 296/214 |
| 4,170,810 | 10/1979 | Pelgg | 24/462 |
| 4,626,021 | 12/1986 | Muscat | 296/107 |
| 4,746,163 | 5/1988 | Moscat | 296/107 X |
| 4,902,068 | 2/1990 | Dowd et al. | 296/214 |
| 4,991,902 | 2/1991 | Schrader et al. | 296/107 |
| 4,998,766 | 3/1991 | Biermacher et al. | 296/136 |

FOREIGN PATENT DOCUMENTS

| | | | |
|---|---|---|---|
| 0248240 | 12/1987 | European Pat. Off. | 296/214 |
| 0284931 | 10/1988 | European Pat. Off. | 296/107 |
| 0294254 | 12/1988 | European Pat. Off. | 296/201 |
| 3606165 | 8/1987 | Germany | 296/118 |
| 656225 | 8/1951 | United Kingdom | 296/116 |
| 751462 | 6/1956 | United Kingdom | 296/118 |
| 821311 | 10/1959 | United Kingdom | 296/118 |
| 951534 | 3/1964 | United Kingdom | 296/107 |
| 1057247 | 2/1967 | United Kingdom | 135/119 |

OTHER PUBLICATIONS

Drawing of General Motors Headliner (prior to Jun. 1, 1988).

*Primary Examiner*—Dennis H. Pedder
*Attorney, Agent, or Firm*—Harness, Dickey & Pierce

[57] ABSTRACT

A convertible top having improved supporting means (16, 36, 46, 50, 56 and 58) for securing pliable covering (10, 12, and 14) to the linkage assembly. The means for securing the pliable covering (10, 12, and 14) includes one or more grooves (18, 20 and 22) supporting means (16, 36, 46, 50, 56 and 58) and attaching means (24, 26, 28) on the pliable covering (10, 12 and 14) which engages a groove (18, 20 or 22) in the supporting means (16, 36, 46, 50, 56 and 58) to secure the pliable covering (10, 12 and 14) in place. A method of assembly is also disclosed.

26 Claims, 3 Drawing Sheets

CONVERTIBLE TOP COVERING RETAINER WITH METHOD FOR USING THE SAME

This application is a continuation of application Ser. No. 680,371 filed Apr. 4, 1991 entitled "Convertible Top Covering Retainer With Method For Using The Same" now abandoned.

BACKGROUND AND SUMMARY OF THE INVENTION

The present invention relates generally to automobile convertible tops, and more particularly to an improved technique for attaching pliable coverings to the convertible top linkage assembly.

The present invention is well suited for convertible vehicles utilizing pliable coverings such as convertible top covers, headliners, and backlights. One common way that pliable coverings are attached to a linkage assembly is by stapling them to tack strips which are in turn fastened to the linkage assembly. Once the tack strip is attached to the linkage assembly, the staples holding the covering to the tack strip are exposed and must be covered. Accordingly, trim members are fastened to the convertible top such that the entire length of the tack strip seam is covered, however, the trim member itself protrudes above the convertible top surface and is itself a variance from the desirable smooth outer surface.

Proper installation of such a trim member involves matching the trim member with the top covering, fastening it to the linkage assembly such that it covers the tack strip seam and seats properly upon the convertible top, and finally placing end caps over the ends of the trim member to hide fasteners which hold the trim member in place. Consequently, existing methods for attaching pliable coverings require a multitude of parts, each requiring precise positioning to achieve the desirable aesthetic appearance. Thus, assembly of these parts requires considerable man hours, and the removal and replacement of a damaged or defective covering requires additional man hours.

The present invention utilizes a novel bow within a convertible top linkage assembly that has a unique elongated supporting means. This elongated supporting means comprises keyhole type grooves which correspond to welts that extend from the edges of the pliable coverings. The welts slidingly engage with the grooves such that the welt is disposed longitudinally within the groove in a dovetail fashion. As a result, a seamless connection between the coverings and the linkage assembly is achieved and the welt can only be removed by sliding the covering in a direction parallel to the groove. Accordingly, the covering is securely retained and an unsightly seam that utilizes conventional fasteners is avoided. Furthermore, the time to assemble a convertible top utilizing the present invention is significantly reduced, as is the time to remove and replace damaged convertible top coverings.

Additional advantages and features of the present invention will become apparent from the subsequent description and the claims taken in conjunction with the accompanying drawings.

DESCRIPTION OF THE PREFERRED EMBODIMENT

Figure 1:
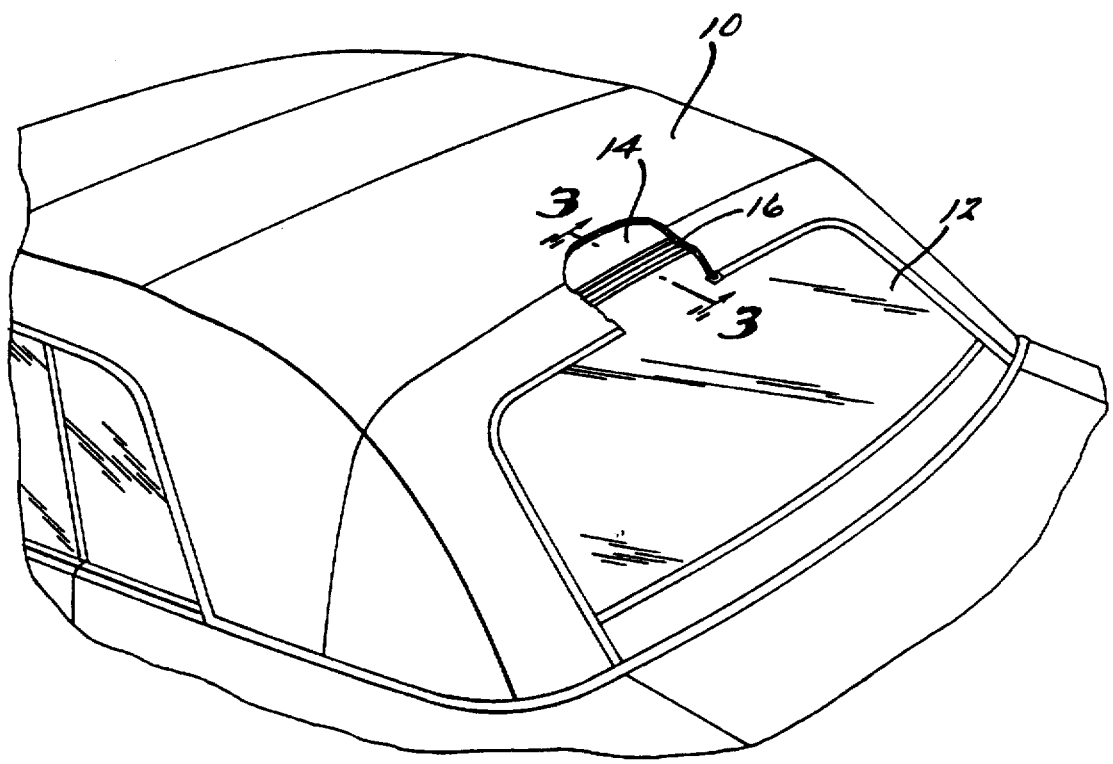
FIG. 1 is a perspective view showing a typical convertible top with the convertible top cover, the backlight and the headliner attached in accordance with the principles of the present invention.
Figure 2:
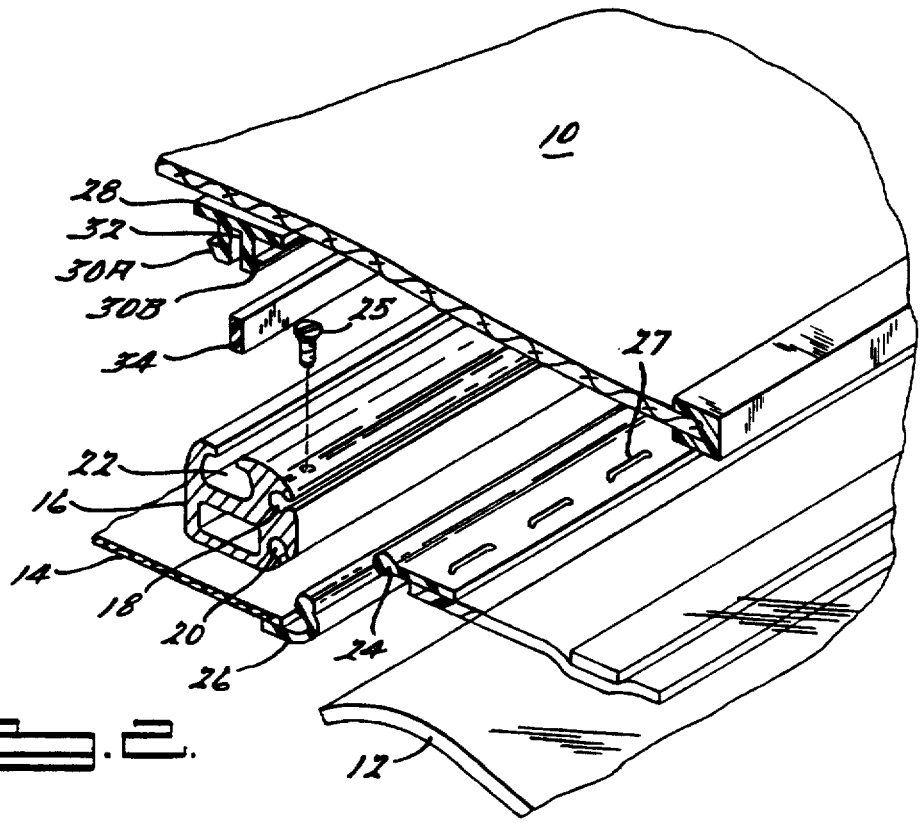
FIG. 2 is an exploded perspective view showing how the convertible top cover, the backlight and the headliner are interconnected by the supporting means of the present invention.
Figure 3:
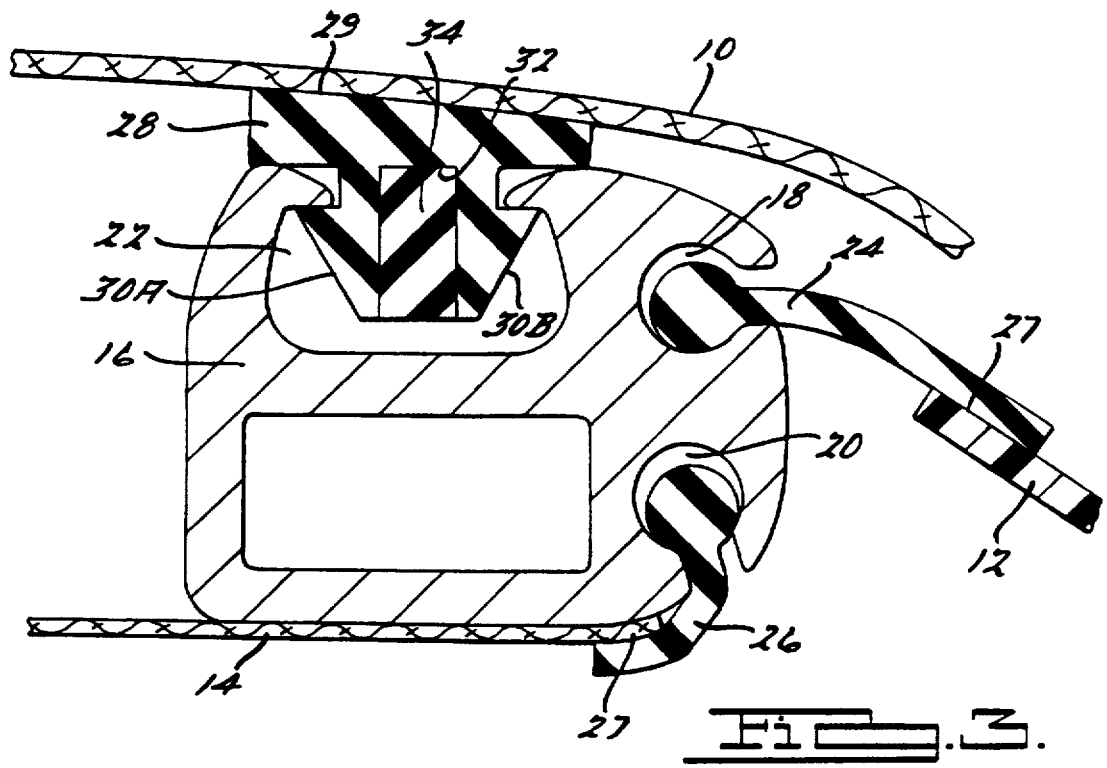
FIG. 3 is a cross sectional view of the supporting means of the present invention taken along line 3—3 in FIG. 1 showing the convertible top cover, the backlight, and the headliner engaged with the grooves in the supporting means in accordance with the principles of the present invention.

Referring now to the drawings, particularly to FIGS. 1–3, the seamless attachment of a convertible top cover 10, a flexible plastic backlight 12 and a uniform thickness headliner 14 to a typical linkage assembly (not shown) is accomplished by utilizing a novel bow member 16 having unique grooved supporting means. Typically, the sole function of a bow member is to support the convertible top cover 10 and the headliner 14, however, the bow member 16 of the present invention additionally provides grooves for attaching pliable coverings directly to the linkage assembly without using conventional fastening means. Furthermore, this bow member 16 can be designed to either replace a conventional bow or to be attached to an existing bow.

The bow member 16 of the present invention is preferably extruded from aluminum, however, it may also be made from other materials such as a fiber reinforced plastic material. FIGS. 2 and 3 illustrate such a bow member 16 having three grooves in accordance with the present invention. These three grooves 18, 20 and 22 are designed to individually retain corresponding attaching means that extend from the pliable coverings and engage with the grooves 18, 20 and 22. Groove 22 is defined by a bottom wall, upstanding walls and a pair of undercut flanges. Further, bow member 16 has a pair of substantially flat external surfaces, curved external surfaces and a cross sectionally enclosed cavity. The two attaching means used to attach the backlight 12 and the headliner 14 to the bow member 16 are key-hole shaped welts 24 and 26. These key-hole shaped welts 24 and 26 are sewn with heavy stitching 27 to the edges of the backlight 12 and the headliner 14 as illustrated in FIG. 2. Note that these key-hole shaped welts 24 and 26 can be an integral portion of the backlight 12 and the headliner 14 (not shown). The welts 24 and 26 slidingly engage with the corresponding grooves 18 and 20, and by virtue of their key-hole engagement cannot be transversely disengaged from the grooves 18 and 20. To prevent the welts 24 and 26 from longitudinally disengaging from the keyhole grooves 18 and 20, small screws 25 pass through the bow member 16 and individually engage with one of the welts 24 and 26. Welts 24 and 26 are each defined as a single piece part, made from a single uniform material, having an enlarged solid core portion and a single integrally formed tail.

The other attaching means shown in FIGS. 2 and 3 is an elongated barbed member 28 which is used to attach the top cover 10 to the bow member 16. This barbed member 28 is attached to an intermediate portion of the interior surface of the convertible top cover 10 by die electric bonding 29 and reinforced by heavy stitching (not shown), however, other means such as an adhesive may be utilized. Moreover, as with the backlight 12 and the headliner 14, the barbed member 28 can integrally extend from the top cover 10. The elongated barbed member 28 has two symmetrical barbed portions 30A and 30B that extend downward from the body of the member 28. These barbed portions 30A and 30B are inserted downwardly into the corresponding groove 22 across the entire length of the barbed member 28 until the entire barbed member 28 engages with the groove 22 as shown in FIG. 3. Note that the two barbed portions 30A and 30B form a slot 32 that traverses the entire length of the barbed member 28. This slot 32 provides the necessary relief that allows the barbed portions 30A and 30B to be inserted into the groove 22. To insure that the elongated barbed member 28 does not inadvertently deflect and disengage from the groove 22, an elongated rectangular strip 34 is slidingly engaged into the slot 32.

Figure 4:
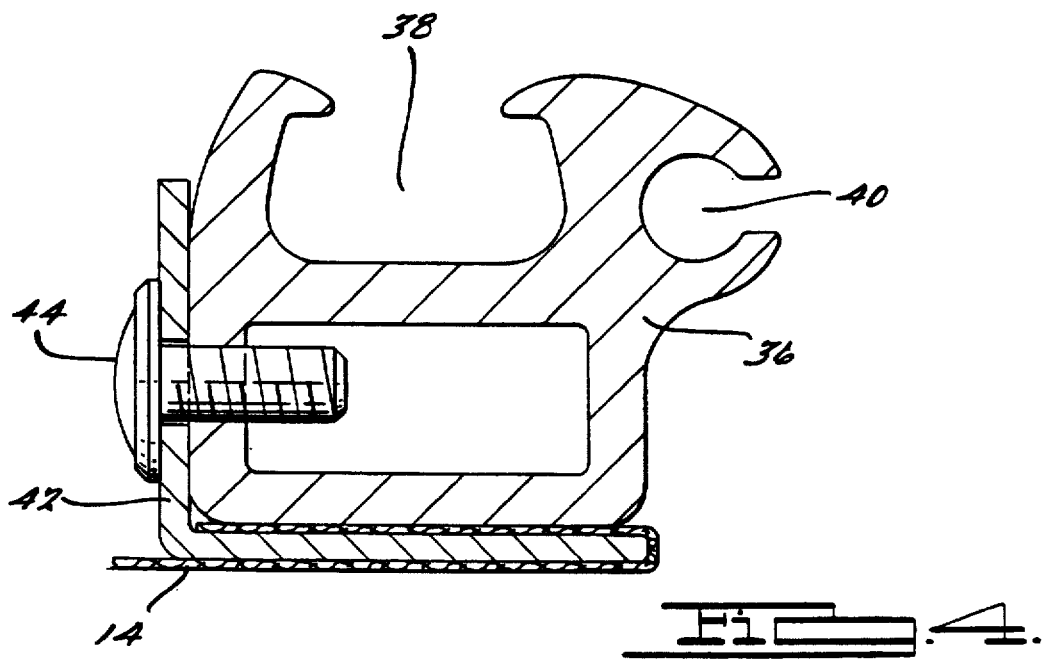
FIG. 4 is a cross sectional view similar to FIG. 3 showing an alternative supporting means in accordance with the present invention with two grooves for engagement with attaching means that extend from the convertible top cover and the backlight, in combination with a conventional headliner retainer for holding the headliner in place.
Figure 5:
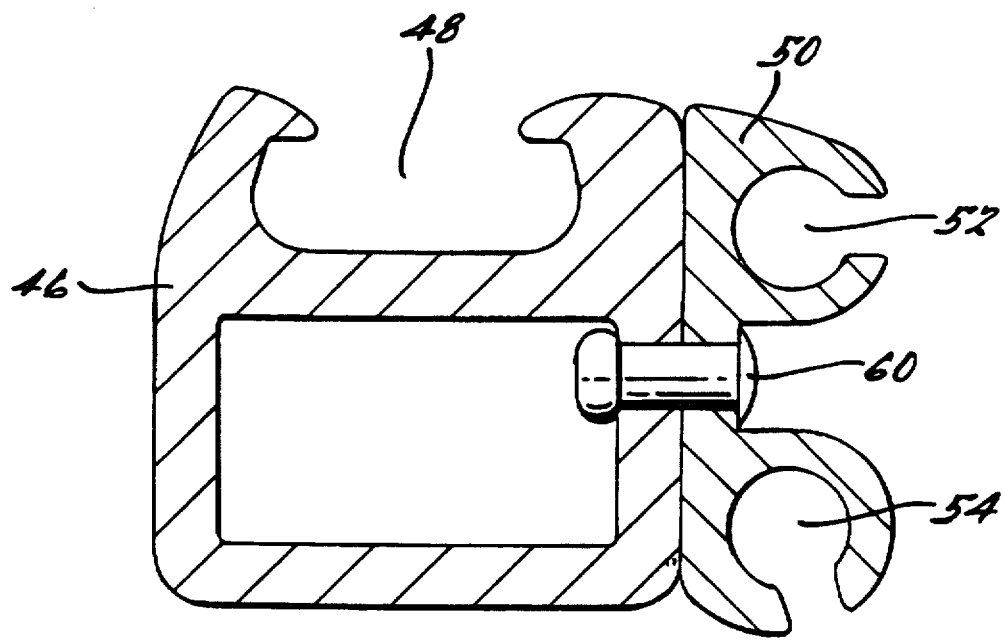
FIG. 5 is a cross sectional view similar to FIG. 3 showing another alternative supporting means in accordance with the present invention having a grooved member, with two grooves for engagement with attaching means that extend from the backlight and the headliner, riveted to a bow member having one groove for engagement with attaching means extending from the convertible top cover.
Figure 6:
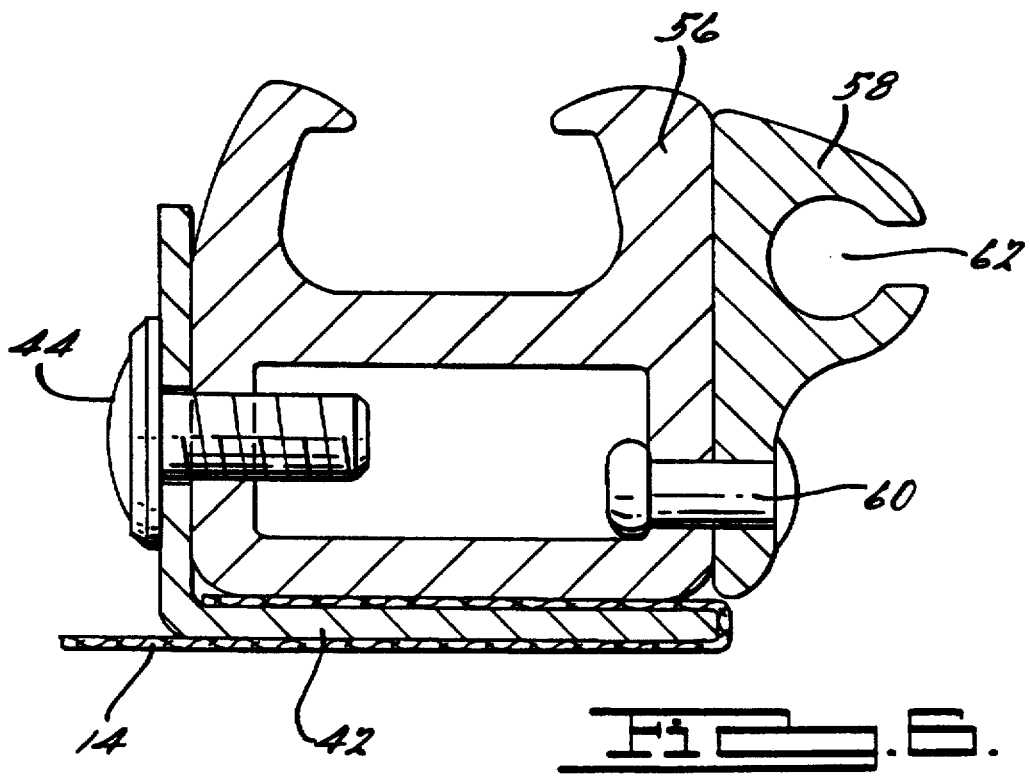
FIG. 6 is a cross sectional view similar to FIG. 3 showing yet another alternative supporting means in accordance with the present invention having a grooved member, with one groove for engagement with attaching means extending from the backlight, riveted to a bow member having one groove for engagement with attaching means extending from the convertible top cover, along with a conventional headliner retainer attached to the bow member for holding the headliner in place.

FIGS. 4–6 are similar to FIG. 3 and illustrate three alternate embodiments of the present invention. The embodiment depicted in FIG. 4 is a bow member 36 that has only two grooves 38 and 40; one groove 38 corresponds to an elongated barbed member 28 that extends from the top cover 10, and the second groove 40 corresponds to a keyhole shaped welt 24 that extends from the backlight 12. Unlike the previous embodiment, the headliner 14 is attached to this bow member 36 by a conventional headliner retainer 42 that is detachably affixed to the bow member 36 with threaded fasteners 44.

The embodiment depicted in FIG. 5 utilizes a bow member 46 having one groove 48 that corresponds to an elongated barbed member 28. In addition, a grooved member 50 having two grooves 52 and 54 is detachably affixed to the bow member 46 by rivets 60 or the like for supporting the backlight 12 and the headliner 14. These grooves 52 and 54 are keyhole shaped for engagement with correspondingly shaped welts 24 and 26 as discussed above.

The embodiment depicted in FIG. 6 also utilizes a bow member 56 very similar to the one depicted in FIG. 5, however, the headliner 14 is attached to this bow member 56 with a conventional headliner retainer 42 that is detachably affixed to the bow member 56 using threaded fasteners 44. Furthermore, the backlight 12 is supported by a grooved member 58 that is detachably affixed to the bow member 56 using rivets 60 or the like. This grooved member 58 has one keyhole shaped groove 62 for engagement with a correspondingly shaped welt 26 that extends from the backlight 12 as discussed previously.

Although the invention has been described and illustrated in connection with certain preferred embodiments there are many variations and modifications that can be effected within the spirit and scope of invention, therefore the invention as set forth in the following claims is not to be limited to the precise details of construction set forth above.

We claim:

1. An apparatus for use with a convertible top linkage assembly of an automotive vehicle comprising:

a pliable cover;

a barbed member having a base affixed to said cover by chemical bonding, said barbed member further having at least one barbed portion, said at least one barbed portion having at least one substantially flat surface and an abutting surface which intersect at a substantially acute angle;

a movable roof bow having an upper portion extending in a cross-car manner with an undercut groove disposed along said bow, said at least one barbed portion insertable within said groove for securing said cover to said bow; and bottom, upstanding walls and at least one undercut flange defining said groove and substantially surrounding a cross section of said at least one barbed portion, said abutting surface of said at least one barbed portion directly contacting against said undercut flange without said cover being disposed between said at least one barbed portion and said undercut flange.

2. The invention of claim 1 wherein said at least one barbed potion includes a pair of barbed portions oppositely extending outward from each other, a slot separating said pair of barbed portion, a longitudinally elongated and substantially polygonally cross-sectionally shaped strip fitting within said slot after said pair of barbed portions have engaged said groove of said bow.

3. The invention of claim 1 wherein said bow has at least one substantially flat external surface, at least one curved external surface and a cross-sectionally enclosed cavity.

4. The invention of claim 1 wherein said bow is elongated and extruded such that said bow has a substantially uniform cross-sectional shape.

5. The invention of claim 1 wherein said cover is defined as an exterior top covering.

6. The invention of claim 1 wherein said groove is generally parallel to a central longitudinal axis of said bow.

7. The invention of claim 1 wherein said barbed member is elongated in a cross-car direction and extends from an intermediate portion of said cover.

8. The invention of claim 1 further comprising an elongated welt that slidingly engages with a correspondingly shaped second groove in said bow.

9. The invention of claim 8 wherein said elongated welt extends from a transparent window.

10. The invention of claim 8 wherein said welt is also retained within said second groove by at least one screw.

11. An apparatus for use with a convertible top linkage assembly of an automotive vehicle comprising:

a transparent and entirely flexible, plastic window;

a welt permanently fastened to said window and extending in a longitudinally elongated manner along an edge of said window; and a movable roof bow having a longitudinally elongated and grooved element disposed along an external surface of said bow, said grooved element being substantially rigid, an enlarged portion of said welt engagable within a groove of said grooved element for securing said edge of said window to said bow.

12. The invention of claim 11 wherein said enlarged portion of said welt has a solid core integrally formed with a remainder of said welt.

13. The invention of claim 11 wherein said welt is flexible.

14. The invention of claim 11 wherein said bow is extruded such that said bow has a substantially uniform cross-sectional shape and said welt also has a substantially uniform cross-sectional shape.

15. The invention of claim 11 wherein said grooved element is a separate piece which attaches to said bow.

16. The invention of claim 11 wherein said groove has an opening at an exterior surface of said bow that is narrower in transverse cross-section than a portion of the groove that is located at a radially inward position within said bow.

17. The invention of claim 11 further comprising means for attaching a cover to said convertible top linkage assembly, said cover being defined as an exterior top covering.

18. The invention of claim 11 wherein said bow movably extends from said convertible top linkage assembly.

19. The invention of claim 11 wherein said grooved element is integrally formed as part of said bow in said convertible top linkage assembly.

20. The invention of claim 11 wherein said groove is generally parallel to a central longitudinal axis of said bow.

21. The invention of claim 11 wherein said welt is retained within said groove by at least one screw that passes through said bow and engages with said welt.

22. An apparatus for use with a convertible top linkage assembly of an automotive vehicle comprising:

a headliner;

a welt permanently fastened to said headliner and extending in a longitudinally elongated manner along a peripheral edge of said headliner, said welt being defined as a single piece and uniform material part having an enlarged portion and a single integrally formed tail, said tail being fastened to said headliner; and a movable roof bow having a longitudinally elongated and grooved element disposed along an external surface of said bow, said enlarged portion of said welt engagable within a groove of said grooved element for securing said headliner to said bow.

23. The invention of claim 22 wherein said headliner is characterized as a flexible covering material having uniform thickness.

24. The invention of claim 23 wherein said tail of said welt is permanently mounted against and secured to a lower and visible surface of said headliner.

25. The invention of claim 22 wherein said enlarged portion of said welt has a solid core integrally formed with a remainder of said welt.

26. The invention of claim 22 wherein said welt is flexible.

* * * * *

UNITED STATES PATENT AND TRADEMARK OFFICE
CERTIFICATE OF CORRECTION

PATENT NO. : 5,540,476
DATED : July 30, 1996
INVENTOR(S) : Lendell E. Cowsert

It is certified that error appears in the above-indentified patent and that said Letters Patent is hereby corrected as shown below:

On the title page, under §371 date: "Dec. 9, 1994" should be — Dec. 29, 1994 —.

Signed and Sealed this

Tenth Day of December, 1996

Attest:

BRUCE LEHMAN

*Attesting Officer*   *Commissioner of Patents and Trademarks*